Dec. 8, 1936. W. HANDKE 2,063,807
ADJUSTABLE TAPERED ROLLER BEARING FOR PITMANS
Filed March 20, 1935
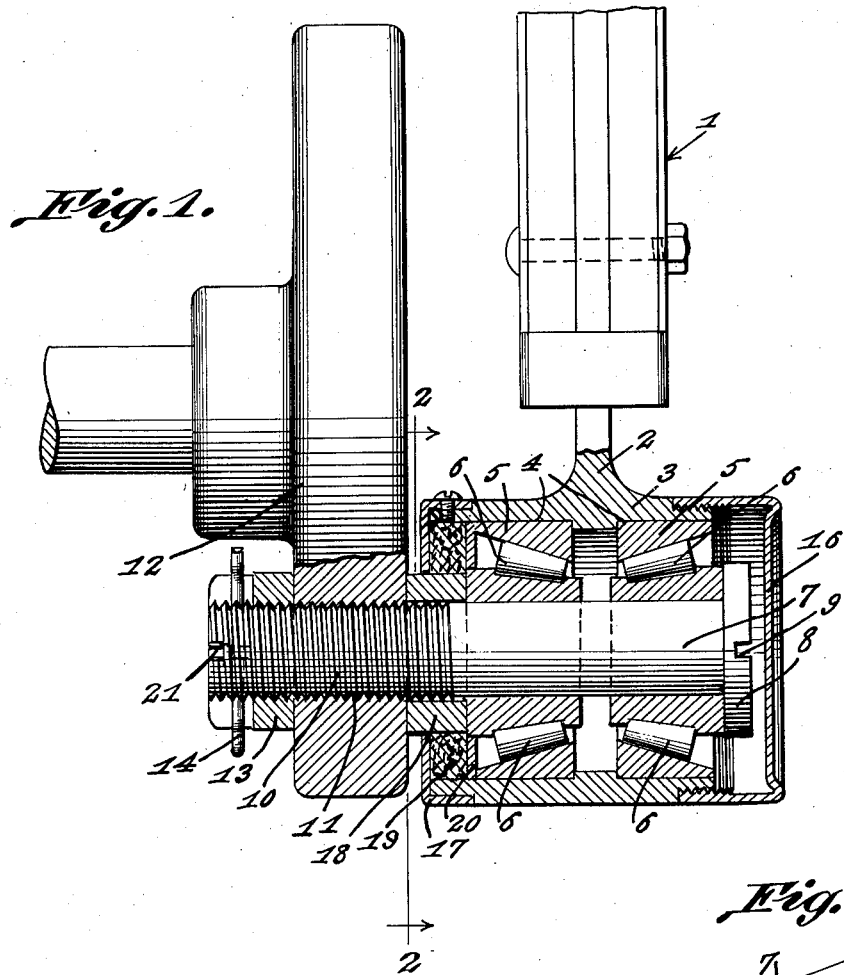
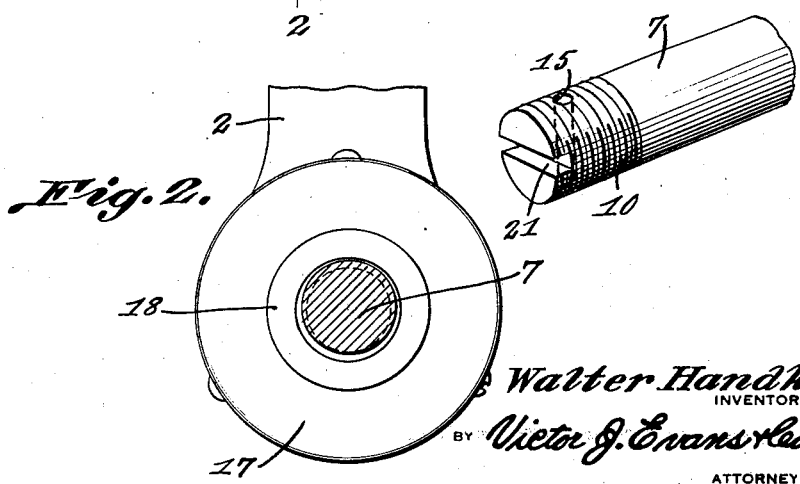
Walter Handke,
INVENTOR
BY Victor J. Evans & Co.
ATTORNEY Patented Dec. 8, 1936

2,063,807

UNITED STATES PATENT OFFICE 2,063,807

ADJUSTABLE TAPERED ROLLER BEARING FOR PITMANS

Walter Handke, Dunlap, Iowa

Application March 20, 1935, Serial No. 12,097

1 Claim. (Cl. 308—179)

This invention relates to an adjustable tapered roller bearing for pitmans, and has for the primary object the provision of a device of this character which will reduce friction to a minimum under maximum loads and may be readily adjusted to compensate for wear and may be thoroughly lubricated assuring maximum wear to all parts thereof.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary plan view, partly in section, illustrating an adjustable tapered roller bearing for a pitman and constructed in accordance with my invention.

Figure 2 is a sectional view taken on the line 2—2 of Figure 1.

Figure 3 is a fragmentary perspective view illustrating the pitman crank pin.

Referring in detail to the drawing, the numeral 1 indicates a pitman rod of a conventional construction and having secured thereto a shank 2 formed integrally with a bearing housing 3 of cylindrical formation. The bearing housing has its inner wall grooved to form seats 4 for the outer races 5 of tapered roller bearings 6, the inner races of which are mounted on a pitman crank pin 7, one end of which has an internal head 8 provided with a tool notch or slot 9. The head forms an abutment for one of the roller bearings by engaging the inner race thereof. The pin 7 is screw threaded, as shown at 10, and is threaded in a screw threaded opening 11 of a pitman crank 12 and has threaded thereon a nut 13 slotted to receive a cotter key 14 after passing through a hole 15 of the pin whereby the nut may be locked in adjusted positions on the bolt and against the pitman crank 12.

Each end of the bearing housing 3 is open and one end is closed by a removable dust cap 16 having threaded connection with the bearing housing. The other end of the bearing housing has mounted thereon a lubricant felt retaining plate 17 centrally apertured to receive a sleeve 18 mounted on the pin 7 and bearing against the pitman crank 12 and the inner face of one of the roller bearings 6. A lubricant felt 19 is positioned in the bearing housing 3 between the plate 17 and a washer 20 arranged between one of the bearings 6 and the lubricant felt. The lubricant felt acts as a packing to prevent the escape of lubricant from the bearing housing at the end adjacent to the pitman crank 12. Lubricant may be supplied to the interior of the bearing housing 3 by any suitable lubricant fitting (not shown).

By adjusting the pin 7 to the pitman crank 12 wear may be compensated for occurring in bearings 6 and other parts associated therewith. A device of the character described is capable of reducing friction to a minimum under maximum loads and may be thoroughly lubricated without the waste of lubricant and thus materially increase the life of the moving parts of the device.

Having described the invention, I claim:

An adjustable roller bearing comprising a cylindrical housing secured intermediate its ends to a pitman and having each end open and provided with internal grooves forming seats, roller bearings located in the housing and including inner and outer races and having said outer races in engagement with the seats, said inner races being capable of adjustment relative to the outer races when wear occurs, a crank pin received by the inner races and having one end headed to abut the inner race of one of the roller bearings and provided with a threaded portion, a collar mounted on the pin and engaging the inner race of the other roller bearing, a packing arranged between the collar and the housing for closing one end of the latter, a packing engaging plate secured to the housing and apertured to receive the collar, said threaded portion of the pin adapted to be threaded through a crank for drawing the latter against said collar, a nut threaded to the pin and engaging the crank and the opposite side of the latter from the collar, and a cap closing the other end of the housing.

WALTER HANDKE.